US012624680B2

(12) United States Patent
Radzikh

(10) Patent No.: US 12,624,680 B2
(45) Date of Patent: May 12, 2026

(54) SPIRAL PATHWAY ROTOR AND SYSTEM UTILIZING SAME

(71) Applicant: Yuriy Radzikh, Willow Grove, PA (US)

(72) Inventor: Yuriy Radzikh, Willow Grove, PA (US)

( * ) Notice: Subject to any disclaimer, the term of this patent is extended or adjusted under 35 U.S.C. 154(b) by 0 days.

(21) Appl. No.: 18/930,193

(22) Filed: Oct. 29, 2024

(65) Prior Publication Data

US 2025/0163897 A1 May 22, 2025

Related U.S. Application Data

(63) Continuation-in-part of application No. 17/715,916, filed on Apr. 7, 2022, now Pat. No. 12,129,856.

(60) Provisional application No. 63/173,013, filed on Apr. 9, 2021.

(51) Int. Cl.
F03G 3/00 (2006.01)

(52) U.S. Cl.
CPC ............ *F03G 3/00* (2013.01); *F05B 2210/11* (2013.01); *F05B 2210/12* (2013.01); *F05B 2240/30* (2013.01); *F05B 2250/15* (2013.01)

(58) Field of Classification Search
CPC .... F03G 3/00; F05B 2210/11; F05B 2210/12; F05B 2240/30; F05B 2250/15
See application file for complete search history.

(56) References Cited

U.S. PATENT DOCUMENTS 1,992,748 A * 2/1935 Groh .......................... F04D 1/12
416/171

* cited by examiner

*Primary Examiner* — Joseph Ortega
(74) *Attorney, Agent, or Firm* — Douglas J. Ryder; Ryder, Mazzeo & Konieczny LLC

(57) ABSTRACT

A rotor having spiral pathways to enable liquid or gas to flow from a center to an exterior thereof. The spiral pathways increases power generated (input force) as liquid/gas travels therethrough. The spiral pathway rotor includes an inner disk and an outer disk. Inner disk includes a central opening for receiving the liquid/gas and is connected to a plurality of pathways that extend toward an outer edge in a spiral manner. Nozzles may be utilized to expel the liquid/gas. Outer disk includes an open interior having a plurality of teeth formed on an interior surface. The teeth are configured to receive the liquid/gas expelled from inner disk which causes the rotor to rotate and thus increases the input force thereof. The input force is amplified to an output force on a shaft connected thereto.

20 Claims, 7 Drawing Sheets

SPIRAL PATHWAY ROTOR AND SYSTEM UTILIZING SAME

BACKGROUND

Levers can be utilized to amplify an input force to provide a greater output force. A lever is a simple machine that includes a rod pivoted about a fixed point (fulcrum). The law of the lever defines that the input force times a distance the input force is from the fulcrum (input lever arm) equals the output force times a distance the output force is from the fulcrum (output lever arm). Accordingly, if the input lever arm is longer than the output lever arm (input force is applied further away from fulcrum than output force is generated), the output force will be greater than the input force (the force will be amplified).

Wheels and axels are a variation of a lever that can also be utilized to amplify an input force to provide a greater output force. In this case, a fulcrum is a center point of the wheel and the axel. A distance from the fulcrum to a circumference of the wheel (wheel radius) is an input lever arm and a distance from the fulcrum to a circumference of the axel (axel radius) is an output lever arm. FIG. 1 illustrates a simple example of a wheel and axel being utilized to amplify the output force. A wheel 100 is connected to an axel 150 so that they share a central point (fulcrum) 140. The wheel 100 has a radius (input lever arm) 110 and requires a certain amount of power 120 to rotate at a certain speed (or torque) and generate an input force. The axel 150 has a radius (output lever arm) 160 and rotates with the wheel 100 at an associated speed (or torque) and creates a certain amount of output force 170 based thereon. As the input lever arm 110 is longer than the output lever arm 160 (wheel radius 110 is larger than axel radius 160), the output force 170 is greater than the input force 120 (the force will be amplified). By way of example, if the radius of the wheel 100 is three times (3x) greater than the radius of the axel 150, the force generated by the axel 170 will be three times (3x) greater than the force consumed by the wheel 120.

The amplification of the force created by the wheel and axel may be utilized for various purposes. For example, the output force 170 may be utilized to move objects or may be utilized to create energy (e.g., generator). The force may be measured as torque or power. Regardless of what the wheel and axel are being used for it is desirable to increase the input force and thus increase the output force or reduce the size difference between the input lever and output lever to obtain the same output force. Alternatively, it may be desirable to reduce the power necessary to obtain the input force and the corresponding output force.

Windmills and waterwheels use water or wind to rotate blades, buckets or the like that form the wheels which in turn rotate the axels. The rotation of the axel is utilized to generate power. The water utilized by a waterwheel may be naturally flowing in a river or the like and thus not require power consumption. Likewise, the air utilized by a windmill may be naturally provided by the atmosphere and thus not require power consumption. Accordingly, the power created by the output force may be a net gain. However, the use of these natural elements is subject to the strength and/or availability of wind and/or water. Accordingly, these wheel and axels may not be capable of working when required or providing a consistent power source. To ensure they run continuously a backup power source may be required.

The use of the wheel and axel to generate power is not limited to windmills and waterwheels using naturally available resources (e.g., wind, water). Rather, the water (or other fluid) and/or air could be pumped in order to turn the wheel (e.g., blades, buckets). The use of a pump requires power to get appropriate pressure and volume to generate desired force and speed for the wheel. The wheel could be turned using, for example, motor(s), magnets and coils, and/or electromagnetic coils. The desired force and speed may be generated by setting frequency and strength of the electrical pulse, according to the strength of magnets and electric coils.

What is needed is a manner in which to reduce the power required to generate the desired input force of the wheel and also to provide a durable and reliable operation.

BRIEF DESCRIPTION OF THE DRAWINGS

The features and advantages of the various embodiments will become apparent from the following detailed description in which.

DETAILED DESCRIPTION

Figure 1:
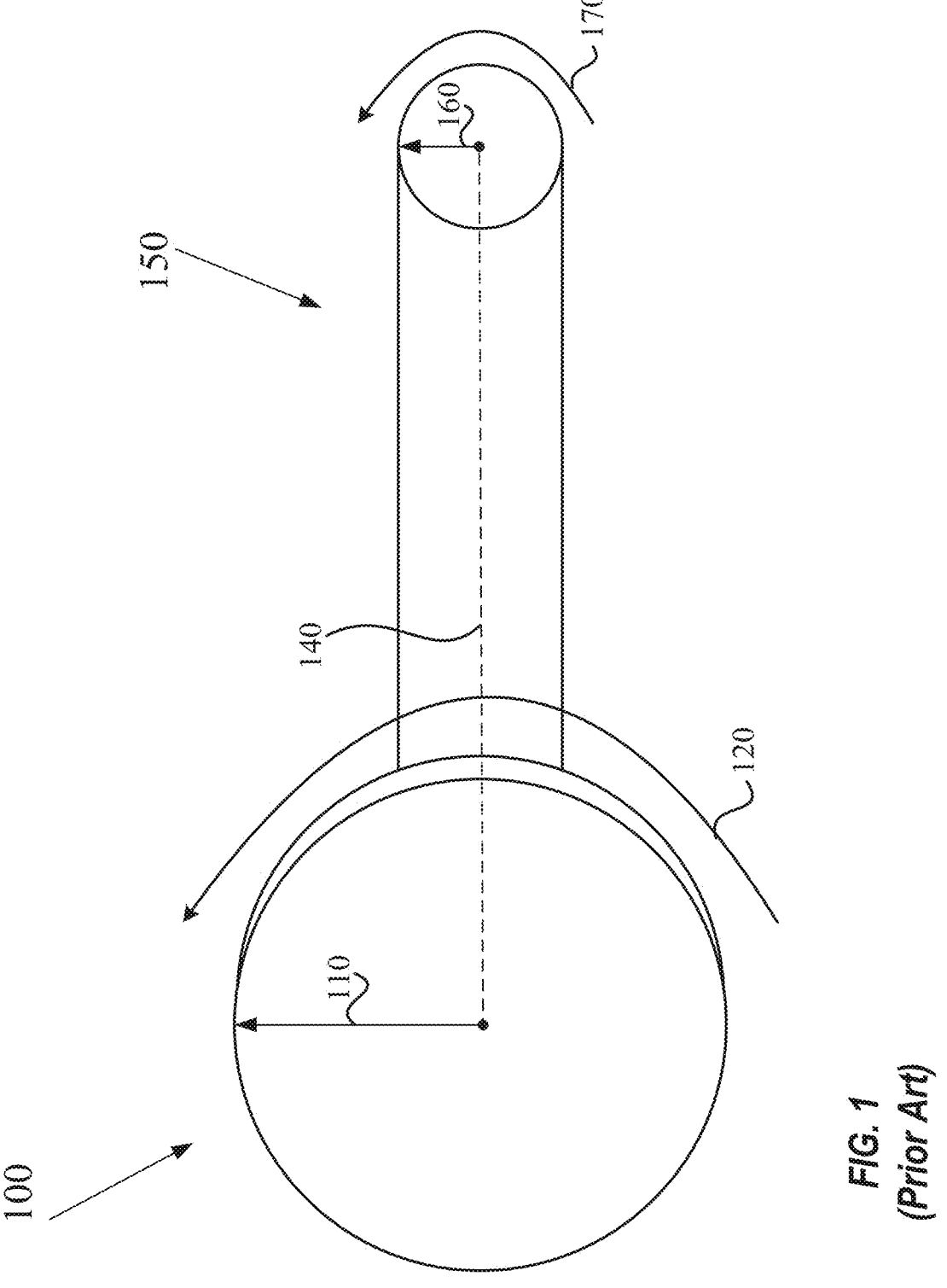
FIG. 1 illustrates a simple example of a wheel and axel showing the increased power in the shaft (amplification of wheel force).
Figure 2:
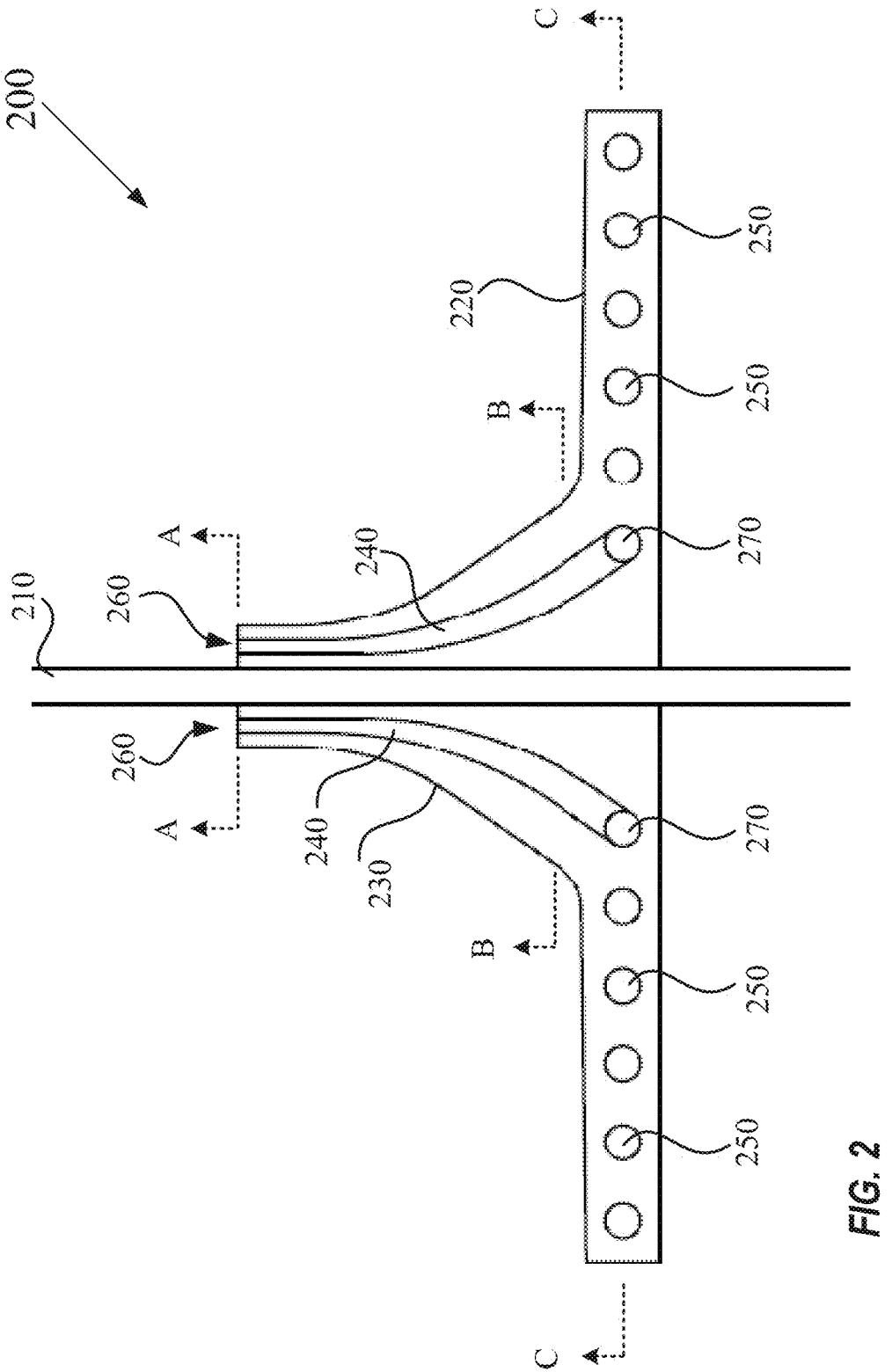
FIG. 2 illustrates a cross section of an example wheel and axel arrangement to increase the input force or reduce power required to achieve desired input force, according to one embodiment.

FIG. 2 illustrates a cross section of an example wheel and axel arrangement 200 to increase input force (e.g., speed, torque) or reduce power required to achieve desired input force. The arrangement includes a shaft (axle) 210, a rotor (wheel) 220 and a housing 230. The housing 230 is secured to a portion of the shaft 210 and the rotor 220 is mounted to the shaft 210 via the housing 230. The housing 230 includes inlets 240 (two illustrated, but in no way limited thereto) to enable a liquid or a gas to be transported therethrough. The housing 230 may flare outward as it approaches the rotor 220. The inlets 240 inlets 240 may extend away from the shaft 210 as they approach the rotor 220. The rotor 220 includes spiral pathways (e.g., tubes) 250 traversing therethrough from an inner portion to an outer portion. The spiral pathways 250 are illustrated as a plurality of circles (six on each side illustrated, but in no way limited thereto) representing the various loops thereof as the spiral pathways 250 traverse the rotor 220. The inlets 240 connect to openings 270 in the spiral pathways 250 located at the inner portion of the rotor 220 located around the housing 230.

In operation, a liquid or a gas is provided to openings 260 in the inlets 240 and is transported through the inlets 240 into the openings 270 in the spiral pathways 250. The liquid may be water, oil or various other liquids. The gas may be compressed air or other gases. The inlets 240 may extend away from the shaft 210 in order to start the outward trajectory of the liquid/gas. The liquid/gas flowing through the spiral pathways 250 increases the force (speed, torque) of the rotor 220 or reduces the power required to reach a desired force (speed, torque) of the rotor 220.

The various components (e.g., 210, 220, 230) could be made of various materials. According to one embodiment, the rotor 220 and the housing 230 may be a single component. According to one embodiment, a single component including the housing 230 and the inlets 240 traversing therethrough and the rotor 220 and the spiral pathways 250 traversing therethrough could be 3D printed.

Figure 3:
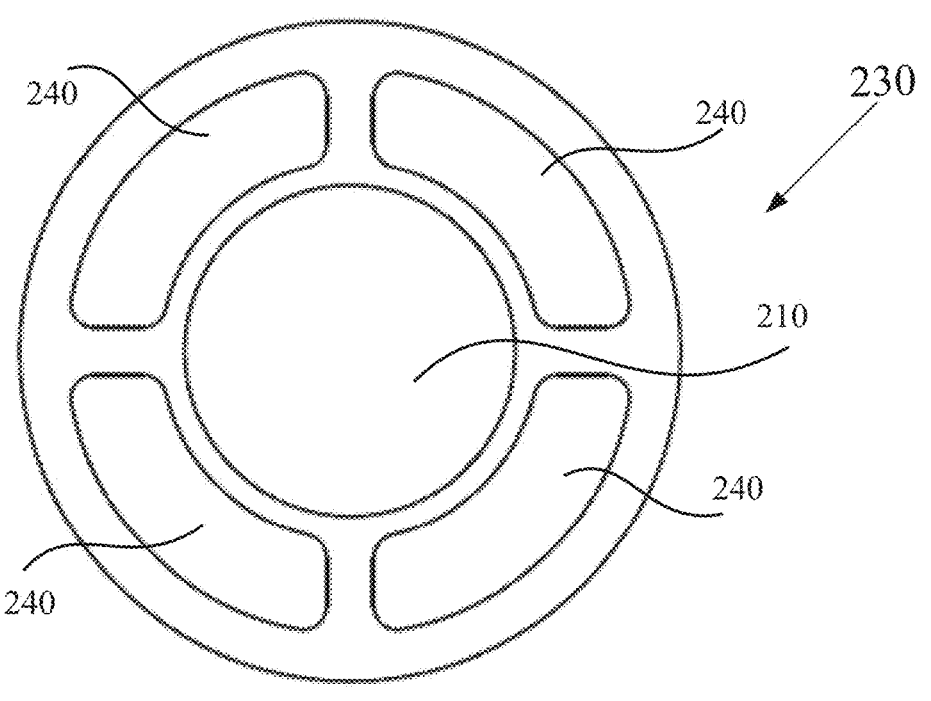
FIG. 3 illustrates a cross-sectional view of FIG. 2 along cross section A-A (start of the housing), according to one embodiment.

FIG. 3 illustrates a cross-sectional view of FIG. 2 along cross section A-A (start of the housing 230). The housing 230 includes inlets 240 (four illustrated, but in no way limited thereto) located around the shaft 210 that the housing 230 is mounted to. The liquid/gas may be transported through the inlets 240.

Figure 4:
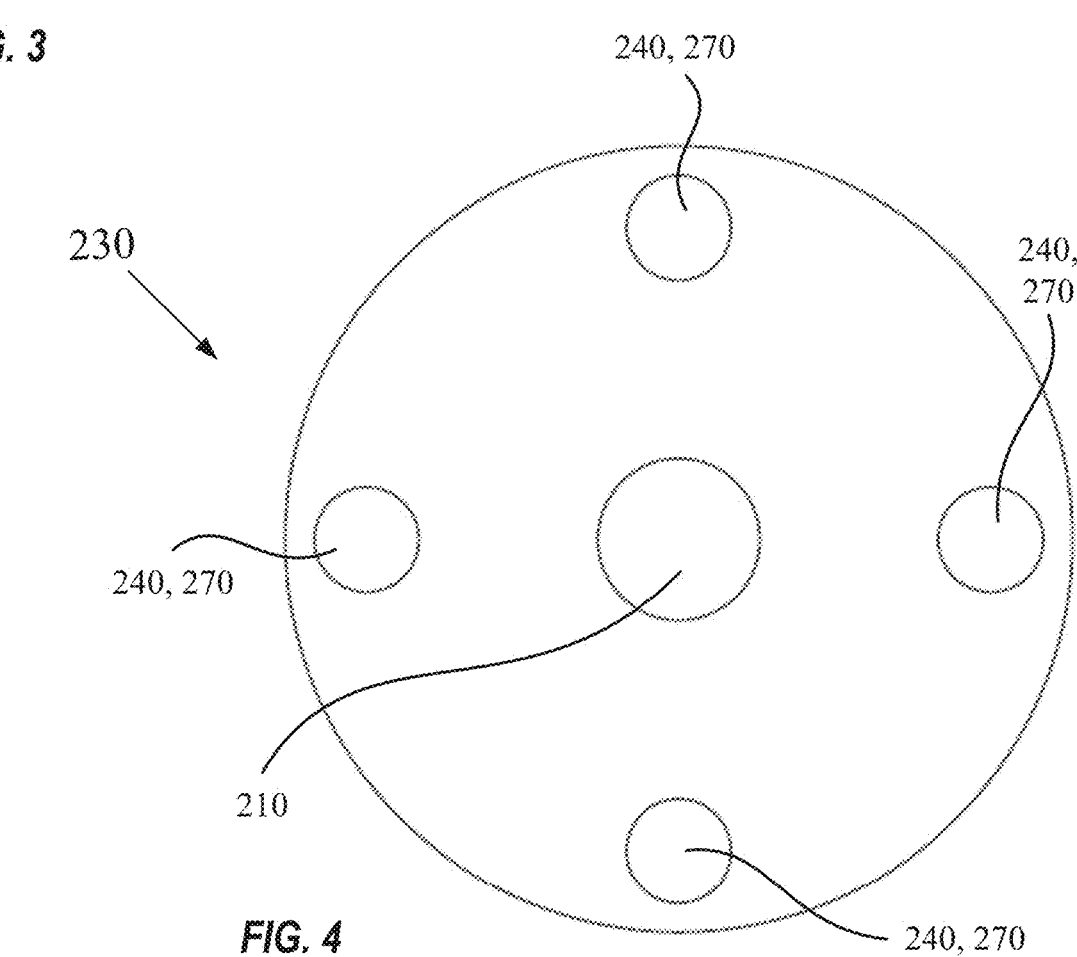
FIG. 4 illustrates a cross-sectional view of FIG. 2 along cross section B-B (ending of housing, beginning of rotor), according to one embodiment.

FIG. 4 illustrates a cross-sectional view of FIG. 2 along cross section B-B (ending of housing 230, beginning of rotor 220). The shaft 210 is centrally located within the housing 230 and the inlets 240 are connected to the openings 270 in the spiral pathways (e.g., tubes) 250. Four inlets 240 and openings 270 are illustrated, but the invention is in no way limited thereto. The inlets 240 and openings 270 are illustrated as being further away from the shaft 210 than the inlets 240 in FIG. 3. As noted above, the inlets 240 may be configured to extend away from the shaft 210 as they approach the rotor 220 to start the outward trajectory of the liquid/gas.

Figure 5:
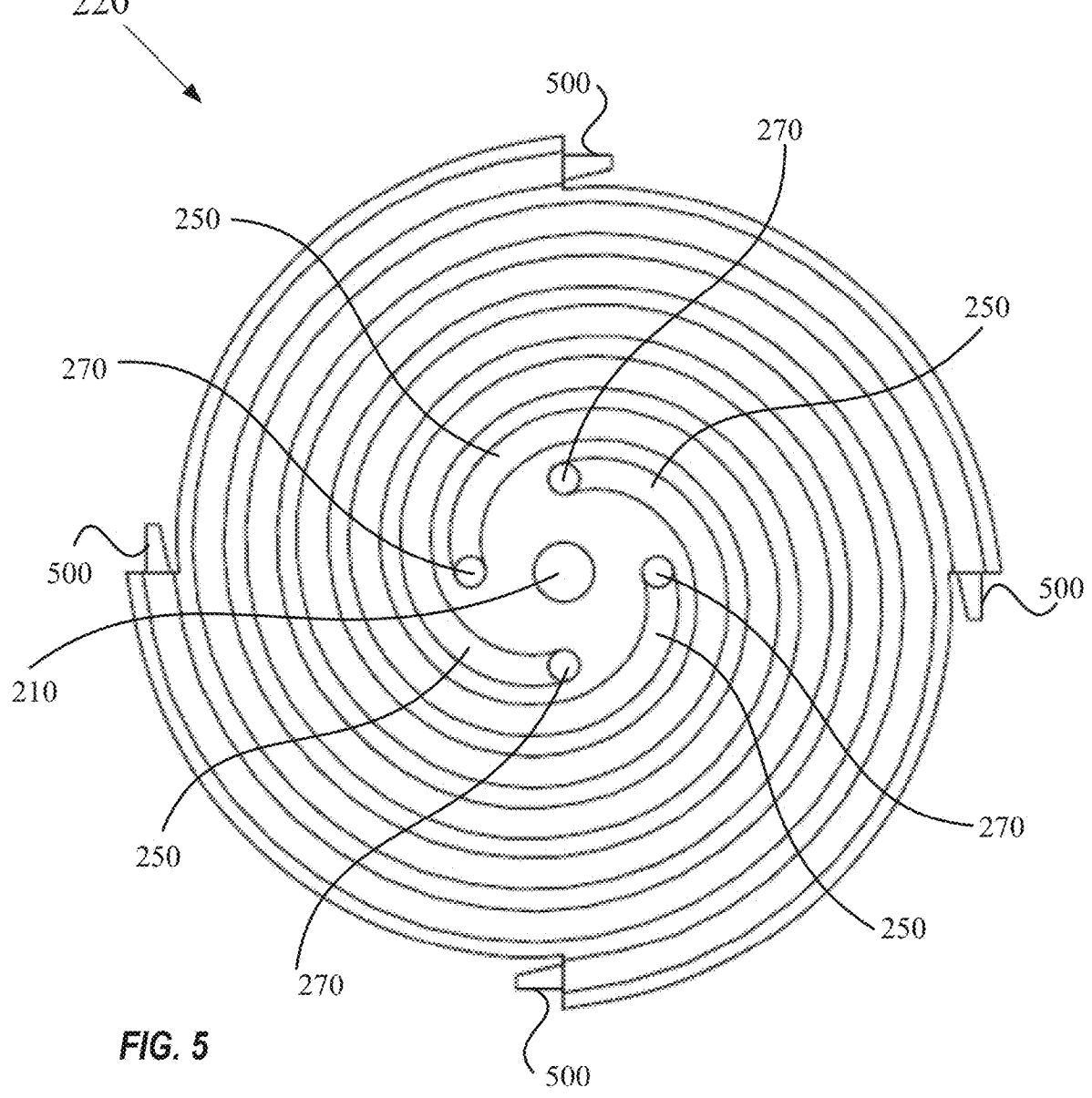
FIG. 5 illustrates a cross-sectional view of FIG. 2 along cross section C-C (the rotor), according to one embodiment.

FIG. 5 illustrates a cross-sectional view of FIG. 2 along cross section C-C (the rotor 220). The shaft 210 is centrally located within the rotor 220 and the openings 270 in the spiral pathways (e.g., tubes) 250 are a certain distance from the shaft 210 (e.g., the openings 270 are located towards end of the housing 230). The spiral pathways 250 traverse in a circular fashion around the rotor 220. Nozzles 500 may be located in the end of the spiral pathways 250 to eject the liquid/gas. Four spiral pathways 250 are illustrated, but the invention is in no way limited thereto. Furthermore, each spiral pathway 250 is illustrated as traversing one and a half times around the rotor 220 but is not limited thereto.

Figure 6:
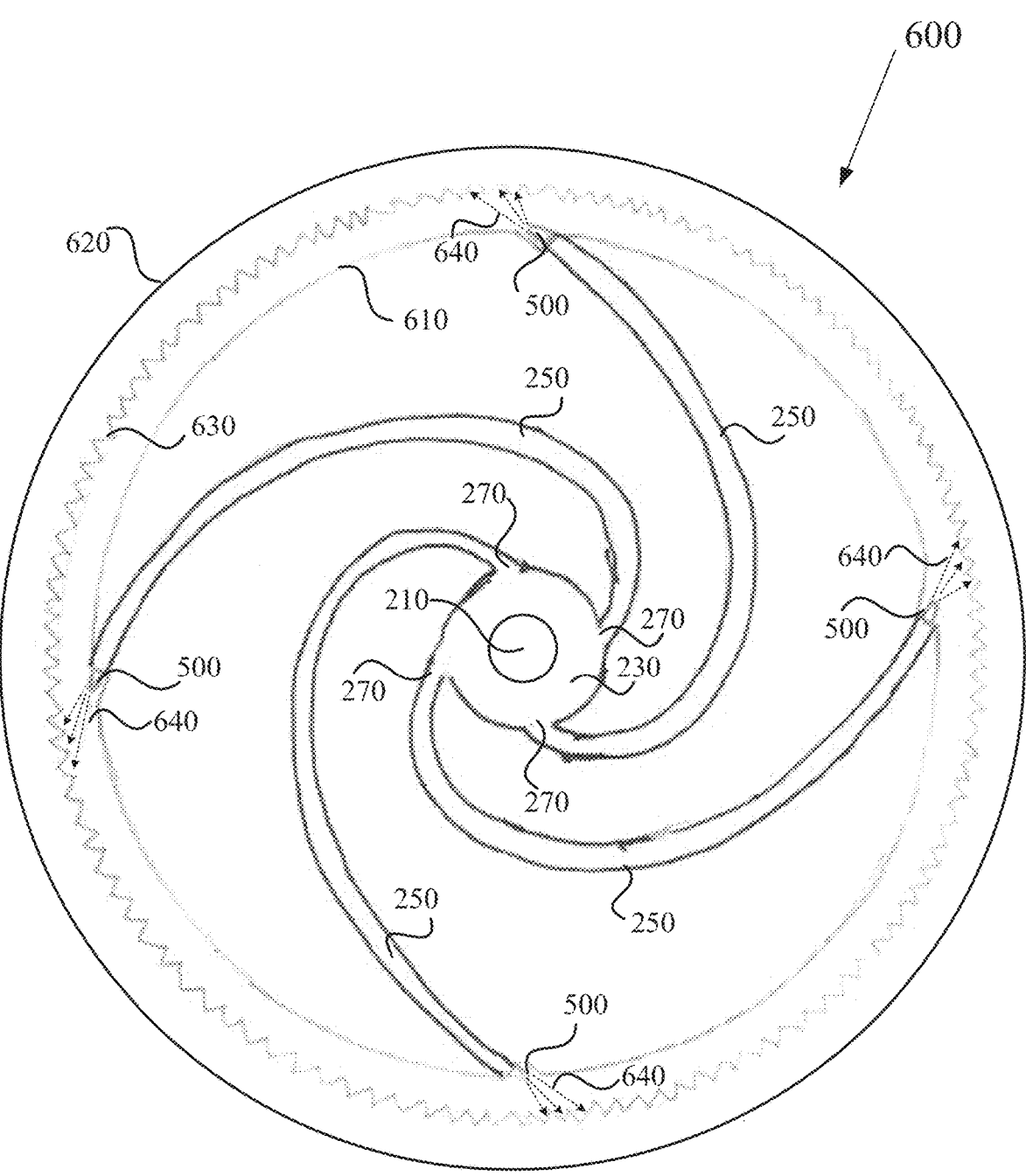
FIG. 6 illustrates an example spiral pathway rotor that includes an inner disk and an outer disk, according to one embodiment.

FIG. 6 illustrates an example spiral pathway rotor 600 that includes an inner disk 610 and an outer disk 620. The inner disk 610 is similar to the rotor 220 discussed above with respect to FIG. 5 in that it includes a plurality of spiral pathways 250 traversing therethrough. The shaft 210 is centrally located within the inner disk 610 and is surrounded by the housing 230. The housing 230 includes inlets 240 (not visible) for providing liquid/gas to the inner disk 610. The inlets 240 feed the liquid/gas to the openings 270 of the spiral pathways (e.g., tubes) 250. The spiral pathways 250 extend to an outer edge of the inner disk 610 where second openings (not identified) are located. Nozzles 500 are located in the openings in the outer edge of the spiral pathways 250. The liquid/gas is received at the openings 270 and then passes through the spiral pathways 250 and is expelled out the nozzles 500 as a pressurized jet of liquid/gas 640.

Four spiral pathways 250 are illustrated with each rotating approximately halfway around the inner disk 610 but is in no way intended to be limited thereby. Any number of spiral pathways 250 and any number of rotations of each of the spiral pathways 250 could be utilized without departing the current scope. Furthermore, the spiral pathways 250 are not intended to be limited to any size, shape, or configuration. Rather, these parameters may change based on the specific use without departing from the current scope.

The outer disk 620 includes an open interior where an interior surface thereof is a gear having a plurality of teeth (blades) 630. The teeth 630 are configured to receive the jet 640 that exits the nozzles 500 so that the jets 640 additionally causes the rotor 600 to rotate and increases the input force. The number, shape and size of the teeth 630 is not intended to be limited in any manner. The teeth 630 may be configured such that one tooth 630 receives the entire jet 640 or so that a plurality of teeth 630 receive the jet 250. As illustrated, a plurality of teeth 630 are receiving the jet 640 from each nozzle 500. The distance the teeth 630 are from the nozzles 500 may be calculated such that the most efficient use of the jet 640 is obtained. This may be the point where the pressure from the jet 640 is the strongest.

It should be noted that as illustrated the teeth 630 are included on the entire inner surface of the outer disk 620. The outer disk 620 may be modified so as to only include teeth 630 in alignment with the nozzles 500 and where the associated jets 640 may be applied without departing from the current scope.

Figure 7:
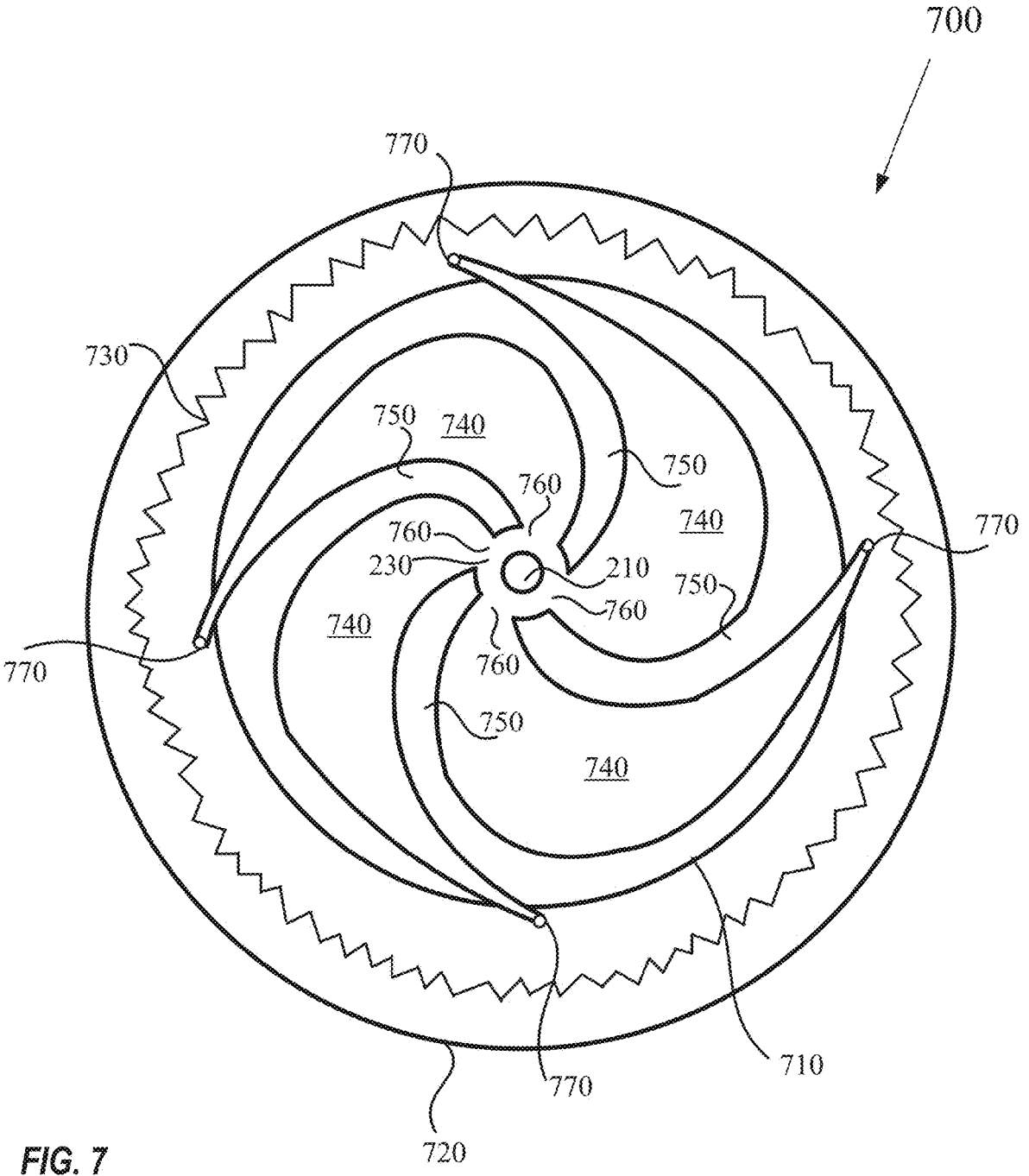
FIG. 7 illustrates an example alternative spiral pathway rotor, according to one embodiment.

FIG. 7 illustrates an example alternative spiral pathway rotor 700. Like the rotor 600, the rotor 700 includes an inner disk 710 and an outer disk 720. The outer disk 720 includes an open interior where an interior surface thereof includes a plurality of teeth (blades) 730. The shaft 210 is centrally located within the inner disk 710 and is surrounded by the housing 230. The housing 230 includes a plurality of inlets 240 (not visible) for providing the liquid/gas to the inner disk 710. The inner disk 710 includes a plurality of hollow spiral sections 740 formed by a plurality of walls 750 (4 illustrated) extending from the housing 230 in a spiral manner. Each hollow spiral section 740 is formed between a pair of adjacent walls 750. An opening 760 from each inlet 240 of the housing 230 to each hollow spiral section 740 is provided. Each hollow spiral section 740 extends from the opening 760 to a wider portion in the center thereof and then narrows at an outer edge of the inner disk 710. The outer edge of the inner disk 710 includes openings (not identified) in alignment with narrow portions (not identified) of the hollow spiral sections 740. Nozzles 770 are located in the openings in the outer edge.

The liquid/gas is provided to the inner disk 710 via the inlets 240 in the housing 230 and enter the hollow spiral sections 740 via the openings 760. The liquid/gas traverses the hollow spiral sections 740 and is repulsed out of the nozzles 770 as a pressurized jet of liquid/gas. The pressurized jet of liquid/gas contacts the teeth 730 and causes the rotor 700 to rotate and increases the input force.

It should be noted that the number of walls 750 and sections 740 is not limited to any specific number. Furthermore, the sections 740 are not intended to be limited to any size, shape or configuration. Rather, these parameters may change based on the specific use without departing from the current scope.

Figure 8:
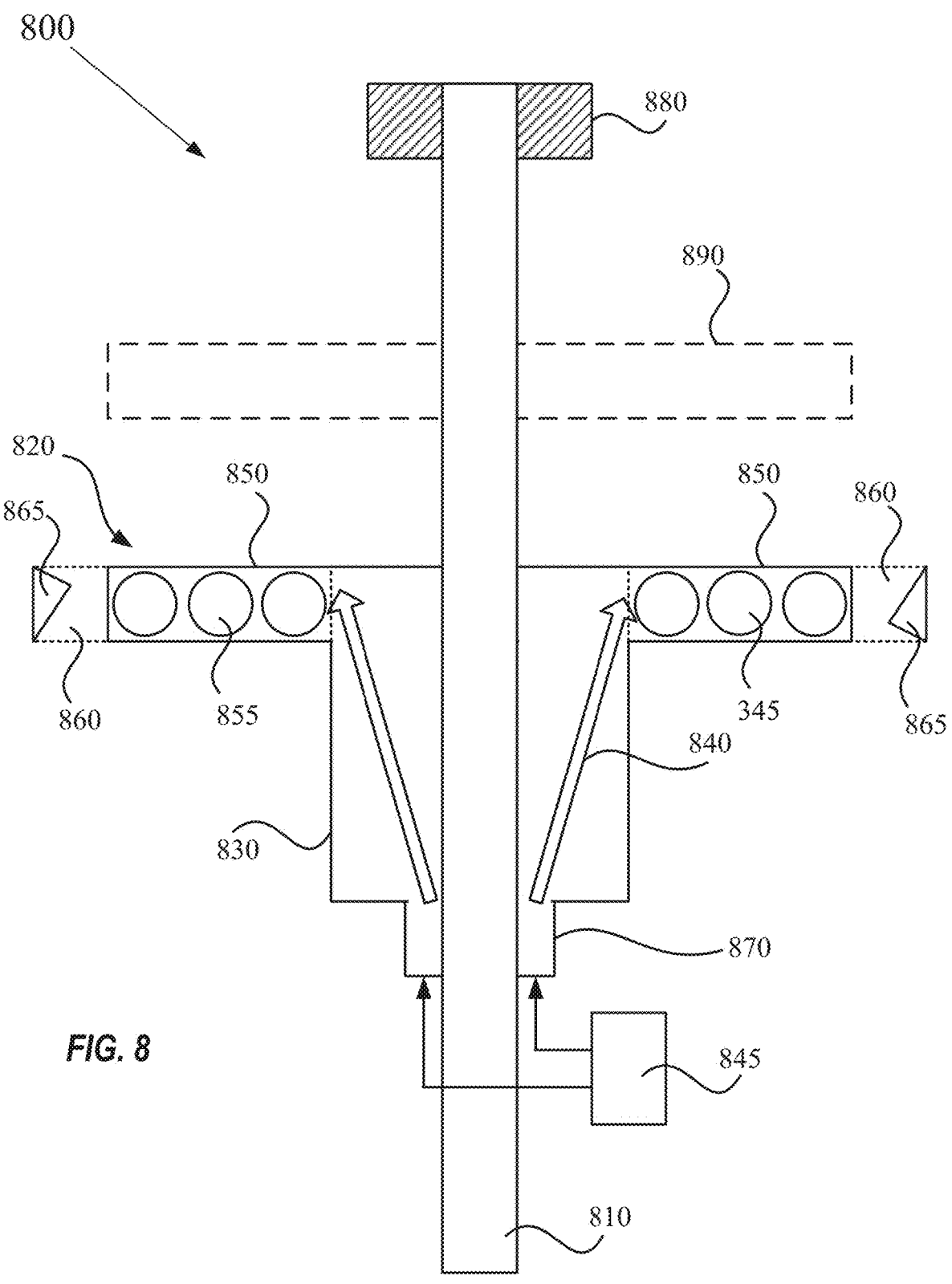
FIG. 8 illustrates a cross-sectional view of an example system utilizing a spiral pathway rotor, according to one embodiment.

FIG. 8 illustrates a cross-sectional view of an example system 800 utilizing a spiral pathway rotor 820 (such as 600 from FIG. 6). The system 800 includes a shaft 810, a spiral pathway rotor 820, a housing 830, and a pump 840. The pump 840 is utilized to pump the liquid/gas from a source 845 to the system 800. It should be noted that the pump 840 may not be required if the source of liquid/gas was free flowing (e.g., stream) and could simply be received by the housing 830. The housing 830 is secured to a portion of the shaft 810. The housing 830 includes inlets 835 (simply illustrated as arrows for ease of illustration) formed therein. The housing 830 is configured to receive the liquid/gas from the pump 840 and provide it to the spiral pathway rotor 820. The spiral pathway rotor 820 is secured to the housing 830 and has openings (not illustrated) for receiving the liquid/gas from the inlets 835.

The spiral pathway rotor 820 may include an inner disk 850 and an outer disk 860. The inner disk 850 may include a plurality of pathways 855 that extend from the housing 830 to openings (not illustrated) in an exterior thereof. The liquid/gas may flow through the pathways 855 and be ejected through nozzles (not illustrated) provided in the openings. The pathways 855 are simply illustrated as a plurality of circles (tubes) in the cross-sectional view. Each of the circles may be a separate pathway 855 or several circles may make up a single pathway 855. The outer disk 860 includes an open interior to enable the inner disk 850 to fit therewithin. The interior surface of the outer disk is a gear having a plurality of teeth (blades) formed therein 865 (a single blade is illustrated on each side). The liquid/gas expelled from the inner disk 850 will engage with the teeth 865 and further cause the rotor 820 to rotate.

The rotation of the rotor 820 causes the housing 830 to rotate and the housing 830 causes the shaft 810 to rotate. The law of levers provides that the force on the shaft 810 is greater than the force on the exterior of the rotor 820. As previously discussed, the increase in force is based on the difference in the radius of the shaft 810 and the radius of the rotor 820. To utilize the force of the shaft 810 a gear 880 may be located on the shaft 810.

It should be noted that once the rotor 820 is fully operational a vacuum may be created within the system (inlets 835 from pump 840 to rotor 820, and pathways 855 within rotor 820) and that at that point the power required to operate the pump 840 could be reduced. According to one embodiment, the system 300 may include a kinetic disk 890 mounted to the shaft 810 (or possibly the housing 830). The rotation of mass of the kinetic disk 890 with the shaft 810 increases the output force of the shaft 810. The system 800 may also include a housing (not illustrated) to secure the various components.

The spiral pathway rotors could be utilized in various systems as one skilled in the art would recognize.

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. A rotor comprising:
an inner disk having a centrally located receptacle, an outer edge and a plurality of spiral pathways traversing from a respective first opening in the centrally located receptacle to a respective second opening in the outer edge, wherein each of the plurality of spiral pathways extend at least halfway around the inner disk, wherein the receptacle, the outer edge and the plurality of spiral pathways are coplanar, wherein the outer edge has a first diameter and the centrally located receptacle has a second diameter that is substantially smaller than the first diameter, wherein the centrally located receptacle is configured to be secured to a housing that includes a corresponding plurality of inlets, wherein each of the plurality of inlets is connected to a respective one of the first openings and is to provide a liquid or a gas to a respective one of the plurality of spiral pathways, wherein the plurality of spiral pathways are configured to pass the liquid or the gas therethrough and provide the liquid or the gas to the plurality of second openings, and wherein the liquid or the gas traversing the plurality of spiral pathways cause the rotor to rotate;
an outer disk having an open interior that provides an inner edge, wherein the inner edge includes a plurality of teeth formed therein, wherein the inner disk is located within the open interior of the outer disk so that the plurality of second openings face the plurality of teeth; and
a plurality of nozzles located in the plurality of second openings, wherein the plurality of nozzles are configured to expel the liquid or the gas that traversed the plurality of spiral pathways as a jet of pressurized liquid or gas in a direction to contact a subset of the plurality of teeth and further cause the rotor to rotate.

2. The rotor of claim 1, wherein the plurality of nozzles are angled.

3. The rotor of claim 1, wherein the plurality of spiral pathways are a plurality of tubes.

4. The rotor of claim 1, wherein the plurality of spiral pathways are a plurality of hollow sections, wherein each hollow section has a varying width as it traverses from the centrally located receptacle to the outer edge and includes an expanded central portion and a narrow end portion.

5. The rotor of claim 1, wherein each of the plurality of spiral pathways extend at least once around the inner disk.

6. A rotor comprising:
an outer disk having an open interior providing an inner edge having a plurality of teeth formed therein;
an inner disk located within the open interior of the outer disk, wherein the inner disk includes a receptacle centrally located, an outer edge, and a plurality of spiral pathways traversing from a respective first opening in the receptacle to a respective second opening in the outer edge, wherein each of the plurality of spiral pathways extend at least halfway around the inner disk, wherein the receptacle, the outer edge and the plurality of spiral pathways are coplanar, wherein the outer edge has a first diameter and the receptacle has a second diameter that is substantially smaller than the first diameter; and
a plurality of nozzles located in the plurality of second openings, wherein
the receptacle is configured to be secured to a housing that includes a corresponding plurality of inlets connected to the plurality of first openings;
each of the plurality of inlets is connected to a respective one of the first openings and is to provide a liquid or a gas to a respective one of the plurality of spiral pathways;
the plurality of spiral pathways are configured to pass the liquid or the gas therethrough and provide the liquid or the gas to the plurality of nozzles,
the plurality of nozzles are configured to expel the liquid or the gas as a jet of pressurized liquid or gas in a direction to contact a subset of the plurality of teeth, and
the liquid or the gas traversing the plurality of spiral pathways and the jet of pressurized liquid or gas contacting the subset of the plurality of teeth cause the rotor to rotate.

7. The rotor of claim 6, wherein the plurality of spiral pathways are a plurality of tubes.

7                                                    8

8. The rotor of claim 6, wherein the plurality of spiral pathways are a plurality of hollow sections, wherein each hollow section has a varying width as it traverses from the receptacle to the outer edge and includes an expanded central portion and a narrow end portion.

9. A system comprising a shaft;

a housing mounted to the shaft and including a plurality of inlets to enable a liquid or a gas to flow therethrough;

a rotor mounted to the housing, wherein the rotor includes a receptacle centrally located, an outer edge, and a plurality of spiral pathways traversing from the receptacle to the outer edge, wherein the receptacle is to receive the housing, wherein the receptacle includes a plurality of first openings to receive the liquid or the gas from a respective inlet and provide to the respective spiral pathway, wherein the liquid or gas traverses the spiral pathways and is expelled out a corresponding one of the plurality of second openings in the outer edge, and wherein the liquid or the gas traversing the plurality of spiral pathways and being expelled therefrom causes the rotor to rotate which in turn causes the shaft to rotate; and an outer disk having an open interior that provides an inner edge, wherein the inner edge includes a plurality of teeth formed therein, wherein the rotor is located within the open interior of the outer disk so that the plurality of second openings face the plurality of teeth and the liquid or the gas is expelled so as to contact a subset of the plurality of teeth and further cause the rotor to rotate.

10. The system of claim 9, wherein the housing includes a first end for connecting to a pump and a second end for connecting to the rotor, and wherein the inlets extend away from the shaft at the second end.

11. The system of claim 9, wherein the housing includes a first end for connecting to a pump and a second end for connecting to the rotor, and wherein the second end flares out from the first end.

12. The system of claim 9, wherein the rotor further includes a plurality of nozzles in the second openings.

13. The system of claim 9, wherein the rotor further includes a plurality of nozzles in the second openings to expel the liquid or the gas as a pressurized stream.

14. The system of claim 9, further comprising a pump to pump the liquid or the gas through the inlets in the housing.

15. The system of claim 9, further comprising a gear mounted to the shaft to rotate with the shaft and transfer a force associated with the rotation of the shaft to another device.

16. The system of claim 9, further comprising a kinetic disk mounted to the shaft to rotate with the shaft and increase a force associated with the rotation of the shaft.

17. The system of claim 9, wherein the plurality of spiral pathways are a plurality of tubes.

18. The system of claim 9, wherein the plurality of spiral pathways are a plurality of hollow sections, wherein each hollow section has a varying width as it traverses from the receptacle to the outer edge and includes an expanded central portion and a narrow end portion.

19. The system of claim 9, wherein the receptacle, the outer edge and the plurality of spiral pathways are coplanar.

20. The system of claim 19, wherein each of the plurality of spiral pathways extend at least halfway around the rotor.

\* \* \* \* \*